US008643928B2

(12) United States Patent
Robinson

(10) Patent No.: US 8,643,928 B2
(45) Date of Patent: Feb. 4, 2014

(54) ILLUMINATION SYSTEMS FOR VISUAL DISPLAYS

(75) Inventor: Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 158 days.

(21) Appl. No.: 11/944,583

(22) Filed: Nov. 23, 2007

(65) Prior Publication Data

US 2008/0117491 A1    May 22, 2008

Related U.S. Application Data

(60) Provisional application No. 60/867,049, filed on Nov. 22, 2006.

(51) Int. Cl.
*G02B 26/00* (2006.01)
*G02F 1/00* (2006.01)

(52) U.S. Cl.
USPC ............................. 359/237; 359/238

(58) Field of Classification Search
USPC ............. 359/237, 589, 634; 372/9; 353/20; 430/221, 517; 250/226
See application file for complete search history.

(56) References Cited

U.S. PATENT DOCUMENTS

| 5,959,702 | A * | 9/1999 | Goodman | 348/744 |
| 6,061,179 | A * | 5/2000 | Inoguchi et al. | 359/464 |
| 6,262,786 | B1 | 7/2001 | Perlo et al. | |
| 6,654,156 | B1 * | 11/2003 | Coker et al. | 359/290 |
| 2002/0018299 | A1 | 2/2002 | Daniell | |
| 2005/0174768 | A1 | 8/2005 | Conner | |
| 2005/0237488 | A1 * | 10/2005 | Yamasaki et al. | 353/20 |
| 2005/0254127 | A1 | 11/2005 | Evans et al. | |
| 2006/0012845 | A1 * | 1/2006 | Edwards | 359/237 |
| 2006/0114664 | A1 | 6/2006 | Sakota et al. | |
| 2006/0176912 | A1 | 8/2006 | Anikitcher | |
| 2006/0203200 | A1 | 9/2006 | Koide | |
| 2006/0250580 | A1 * | 11/2006 | Silverstein et al. | 353/20 |
| 2007/0183466 | A1 * | 8/2007 | Son et al. | 372/24 |
| 2011/0019112 | A1 * | 1/2011 | Dolgoff | 349/8 |

FOREIGN PATENT DOCUMENTS

JP    2005116266    4/2005
WO    9520811 A1    8/1995

OTHER PUBLICATIONS

International search report and written opinion in corresponding PCT/US07/85475 mailed Apr. 10, 2008.
International Preliminary Report on Patentability for PCT/US2007/085475 mailed Jun. 4, 2009.
Supplementary European Search Report from co-pending European application number 07864751 filed May 21, 2012.
Reasons for rejection from Japanese patent application No. 2009-538527 dated Jul. 17, 2012 (with translation).

* cited by examiner

*Primary Examiner* — Mahidere Sahle
(74) *Attorney, Agent, or Firm* — Neil G. J. Mothew; Darlene K. Kondo

(57) ABSTRACT

Two or more spectral emitters are used to provide spectrally separated light illumination onto modulating pixels of a visual display. The spectral emitters may be lasers or LEDs, typically having coherent properties. Generally, a display system includes a spectral emitter array, a light collimating element, a lens array, and a light modulating panel. The spectral emitter array includes a first spectral emitter operable to emit light of a first wavelength and a second spectral emitter operable to emit light of a second wavelength. The light collimating element is operable to direct light from the spectral emitter toward the lens array, and the lens array is operable to direct light toward the light modulating panel.

29 Claims, 14 Drawing Sheets

Figure 1a

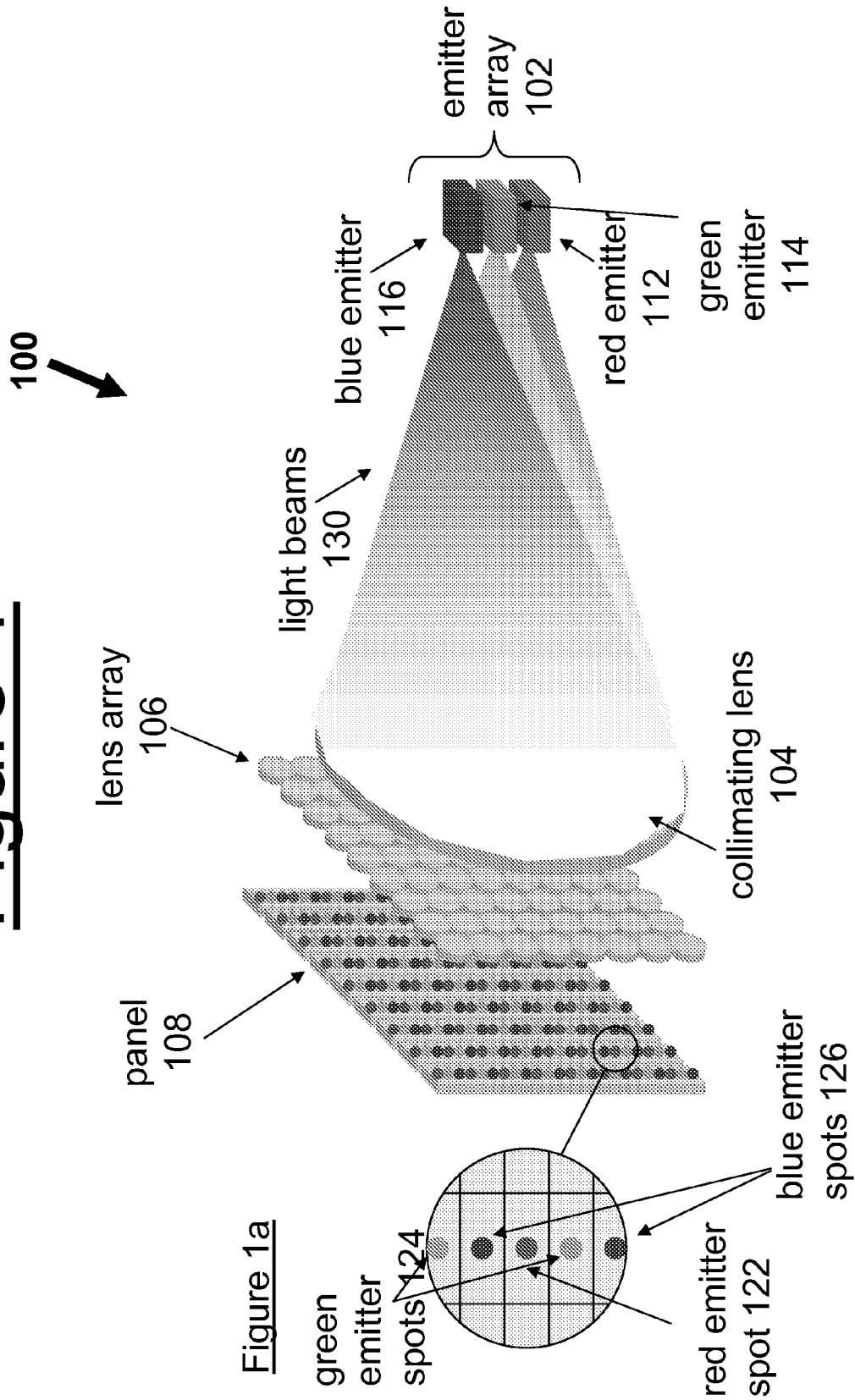

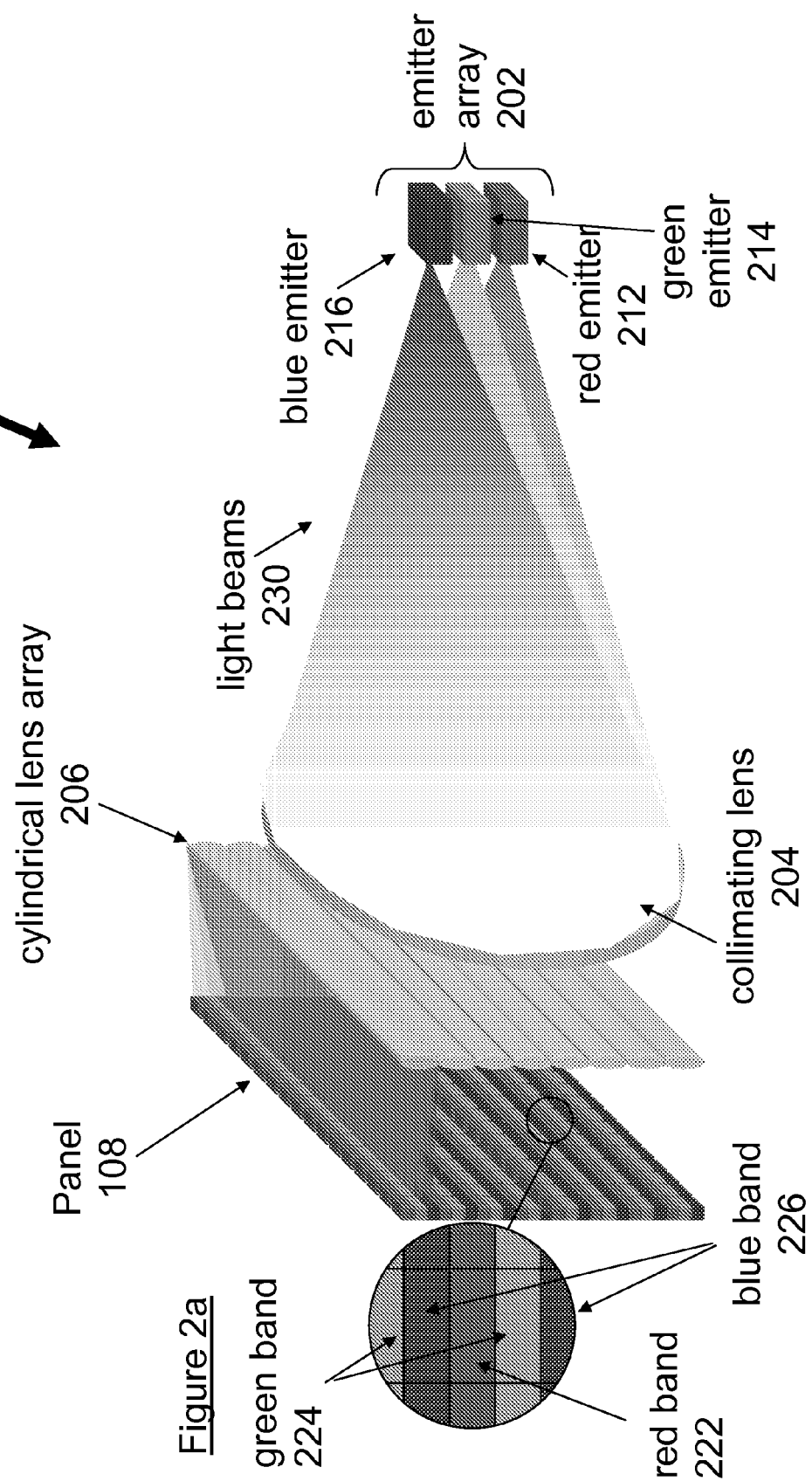

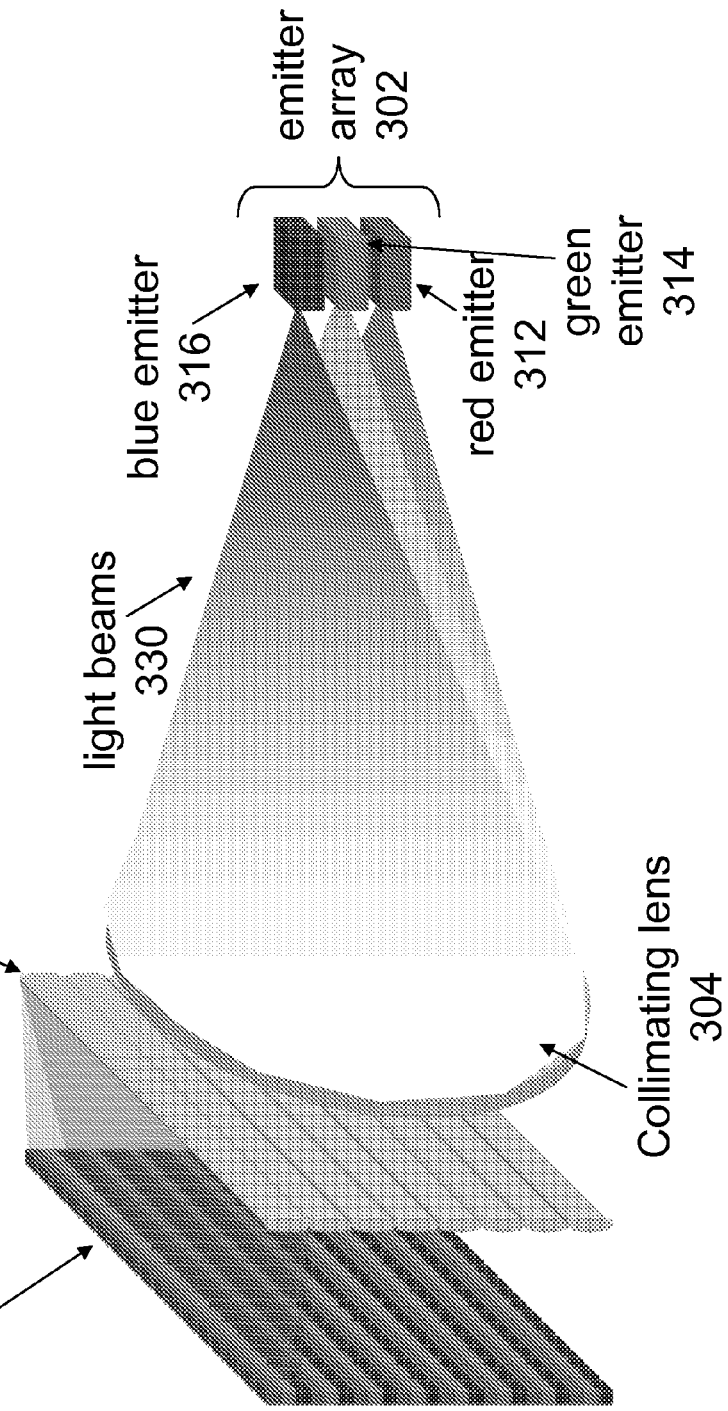

Frame 2 – second 5ms period

Frame 3 – third 5ms period

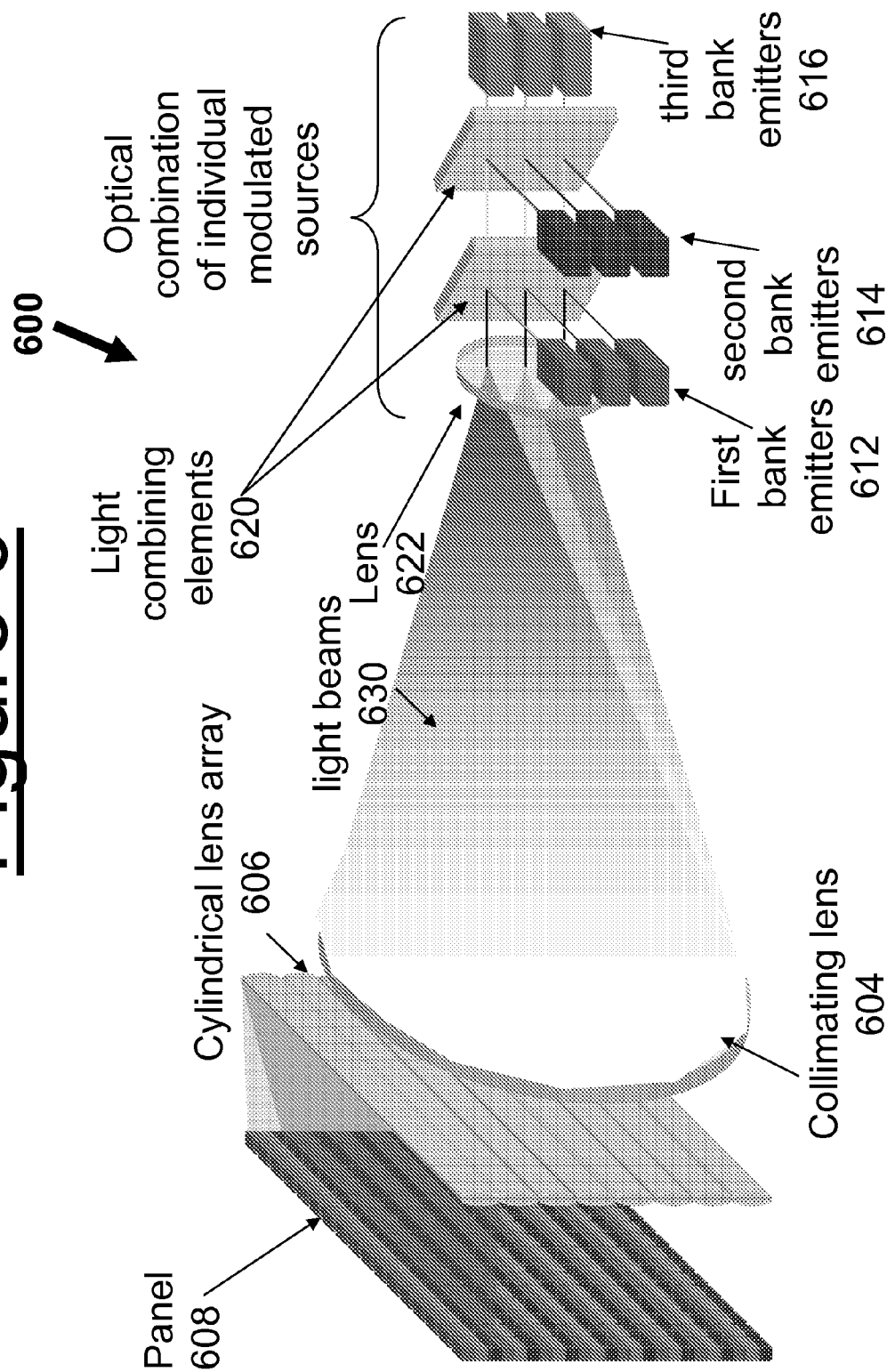

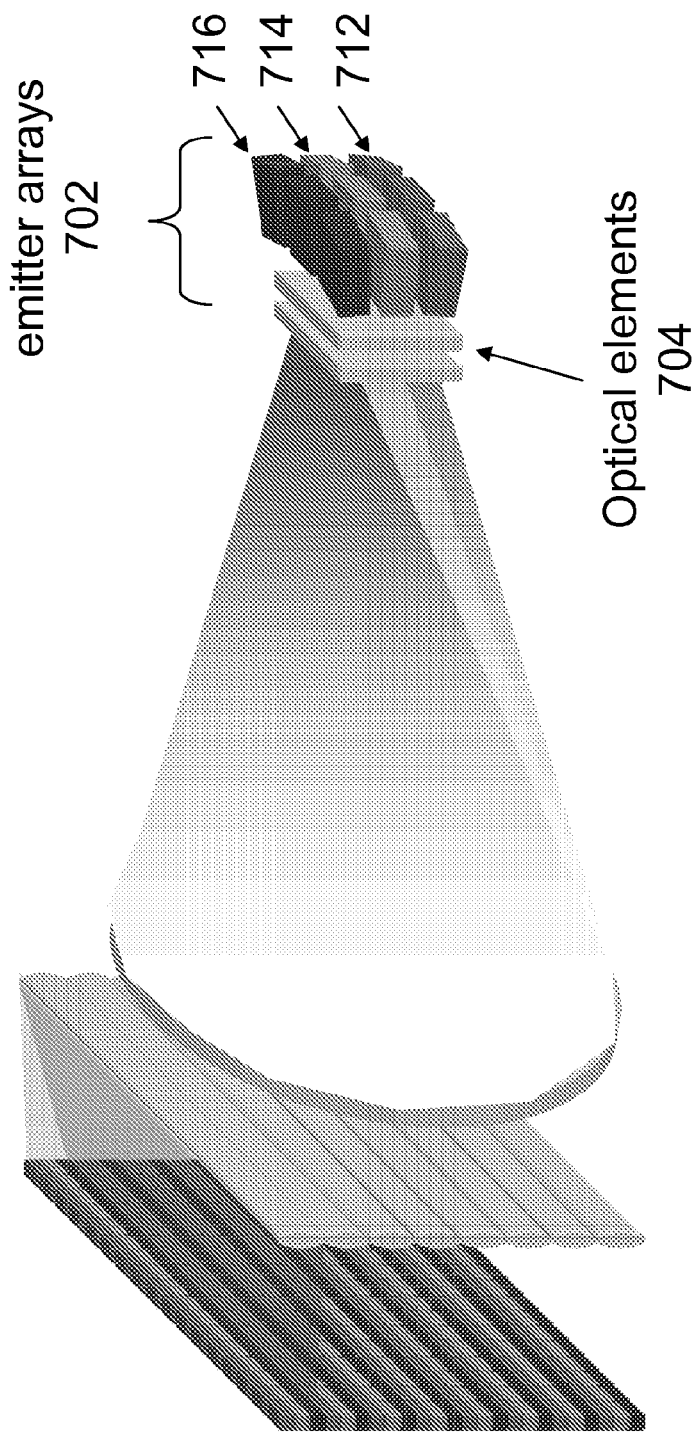

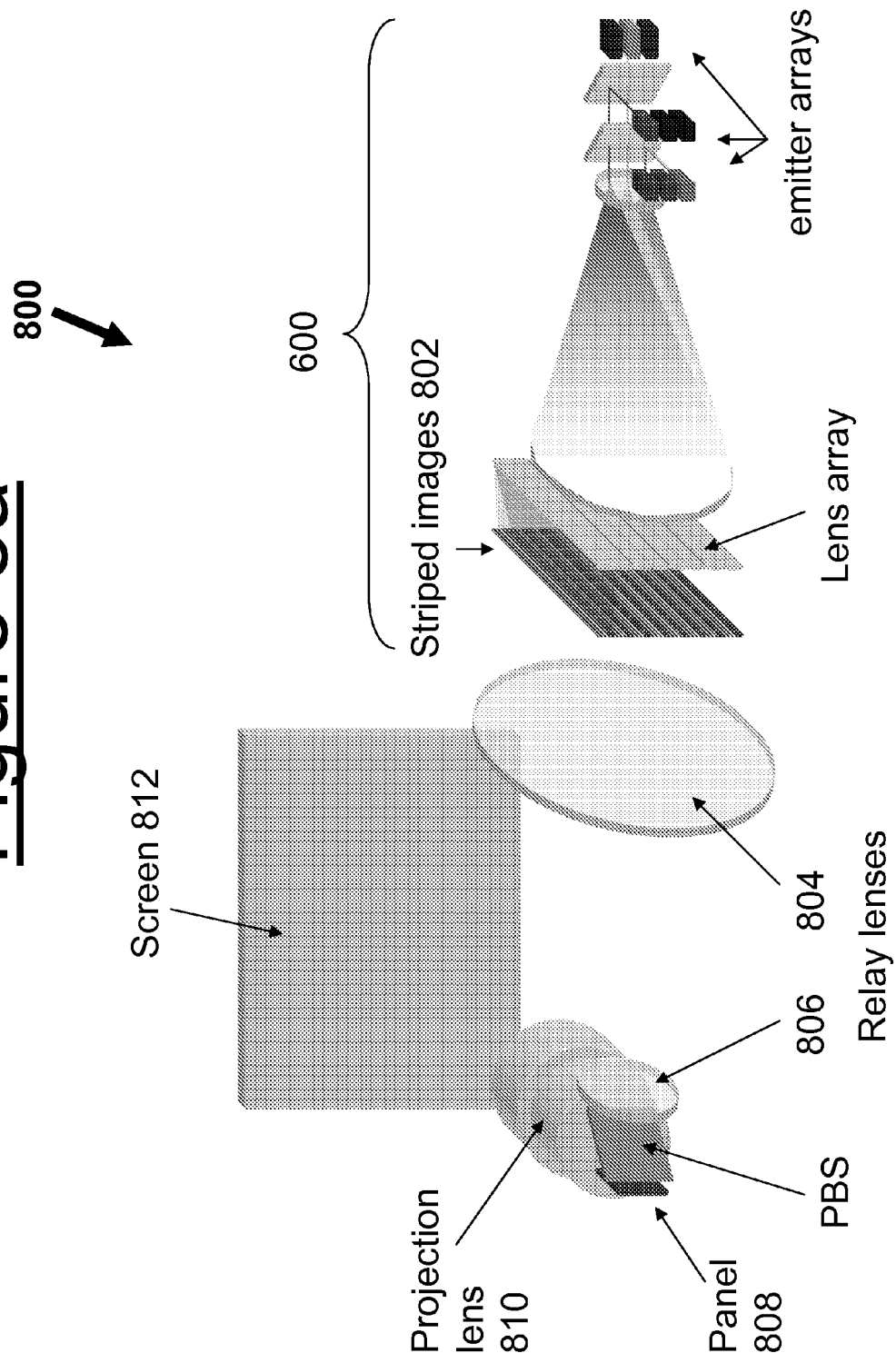

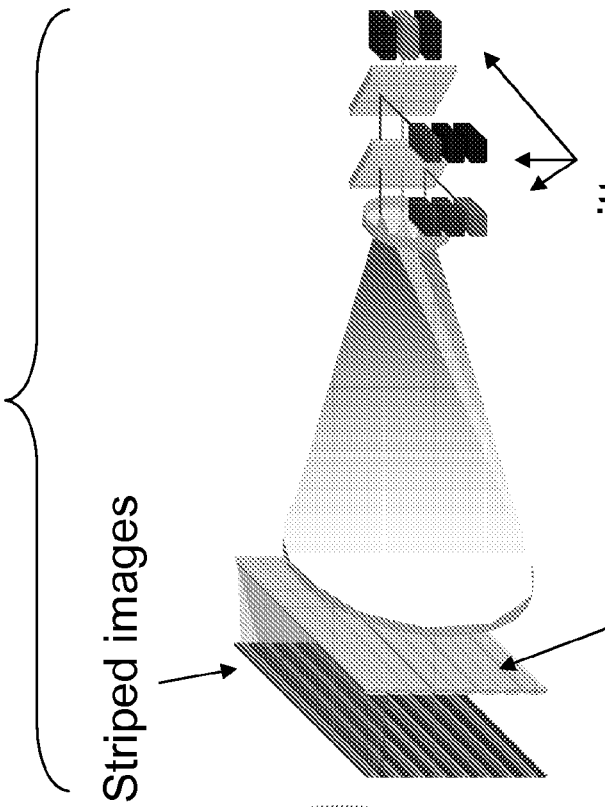

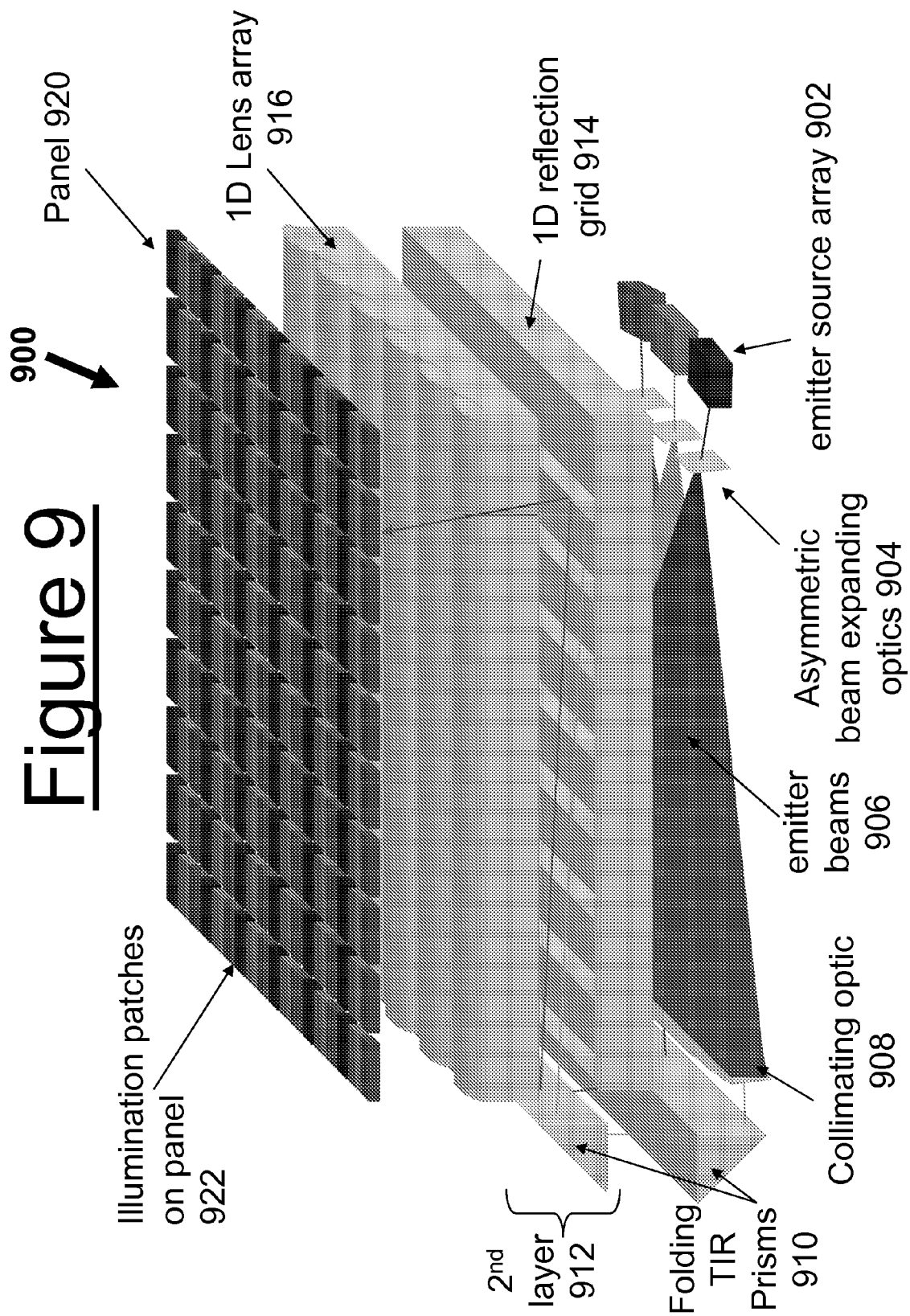

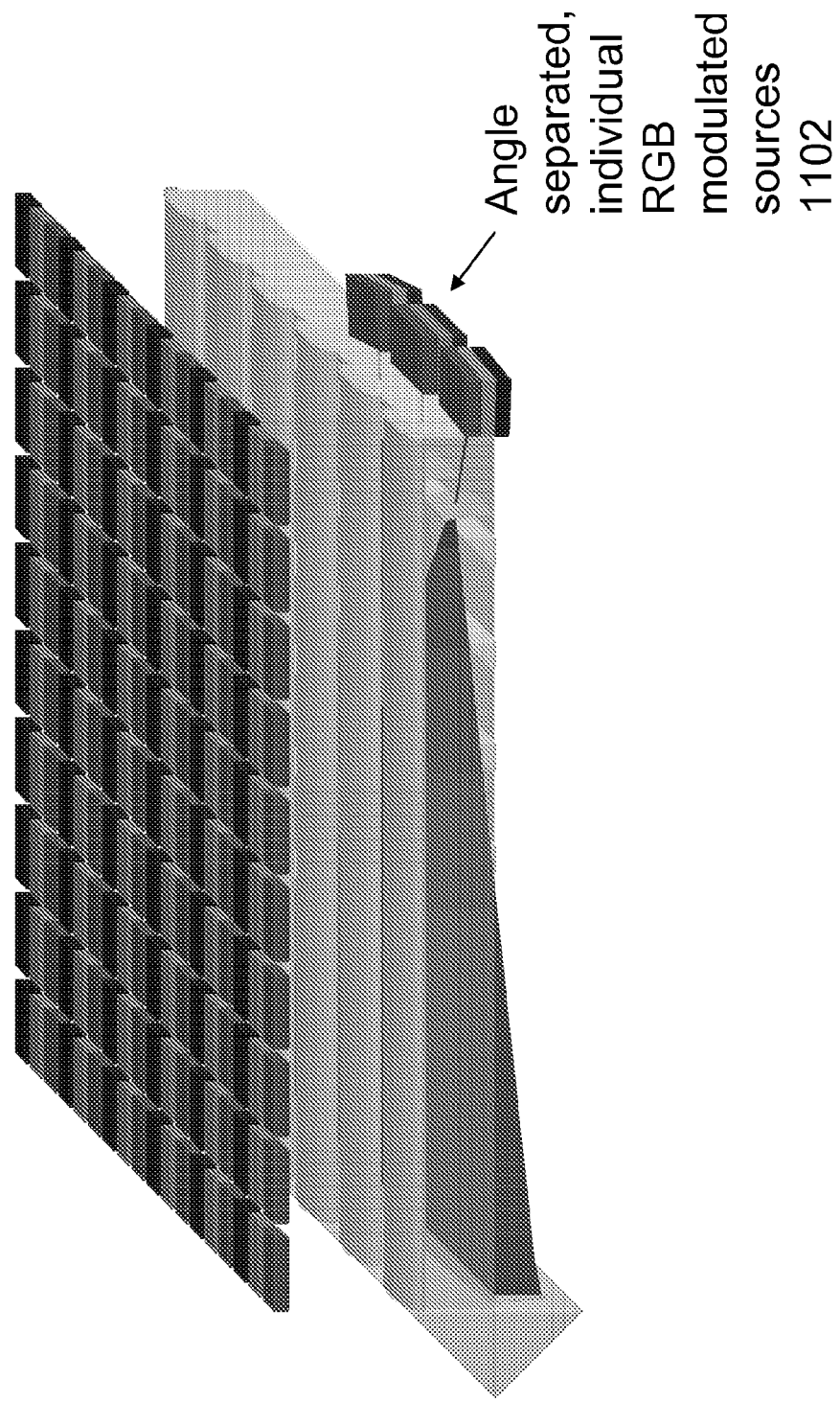

ILLUMINATION SYSTEMS FOR VISUAL DISPLAYS

CROSS-REFERENCE TO RELATED APPLICATIONS

This disclosure claims priority to commonly-assigned U.S. Provisional Patent Application No. 60/867,049, entitled "Laser illumination," filed Nov. 22, 2006, herein incorporated by reference, and is filed on the day following a Federal Holiday.

TECHNICAL FIELD

This disclosure generally relates to illumination systems for visual displays, and more specifically relates to illumination systems that use coherent spectral emitters to provide illumination to direct view displays and projection displays.

BACKGROUND

Lasers can be considered the ultimate in illumination sources offering both spectral and spatial purity. The light emitting sources emit substantially one wavelength, with diffraction-limited collimation making them orders of magnitude brighter than conventional sources such as UHP lamps, with the option of adding extra emitters without exceeding étendue limitations of any one system. These properties overcome many issues associated with conventional sources and offer opportunities with greater efficiencies in lower cost simpler systems. Some LEDs have similar properties to lasers and may similarly be used as spectral emitters.

To date, laser displays have been of three types. The first utilizes scanning mirrors to deflect a modulated beam in a raster format. See e.g., Symbol Technologies OD Monochrome projector. A second illuminates a conventional, two-dimensional spatial light modulator or panel (e.g., laser illuminated RPTV demonstrated by Mitsubishi at CES 2006), and a third combines the first two using a one dimensional spatial modulator with a single axis deflecting mirror (e.g., GxL projector from Sony). Scanning systems are inherently more unsafe than spatially modulated beams since in the event of the scanning mechanism stopping, a single high intensity laser beam can be directed accidentally into the eye of a viewer. For this reason these systems are typically limited to micro projection systems where laser intensities are modest. Hybrid systems offer the potential of high quality images but invariably suffer from asymmetric spatial performance and require more complex tandem systems.

SUMMARY

Disclosed embodiments illustrate illumination of spatial modulators, including those that are liquid crystal based. Polarized laser or LED output is particularly suited to illumination of liquid crystal display systems.

Generally, an embodiment of a display system includes a spectral emitter array, a light collimating element, a lens array, and a light modulating panel. The spectral emitter array includes a first spectral emitter operable to emit light of a first wavelength and a second spectral emitter operable to emit light of a second wavelength. The light collimating element is operable to direct light from the spectral emitter toward the lens array, and the lens array is operable to direct light toward the light modulating panel.

In another embodiment, a direct view display system is provided that uses a folding system of optics. The direct view display system generally includes a spectral emitter array, a light collimating element, a light directing element, a reflecting element a lens array, and a light modulating panel. The spectral emitter array includes a first spectral emitter operable to emit light of a first wavelength and a second spectral emitter operable to emit light of a second wavelength. The light collimating element is operable to collimate light from the spectral emitter array. The light directing element receives light from the collimating element in a first direction and transmits the light in substantially the opposite direction in a different but substantially parallel plane to the received light. The reflecting element is operable to reflect light from the light directing element toward the lens array. The lens array is operable to direct light toward the light modulating panel.

In yet another embodiment, a projection display system includes an illumination subsystem, a spectral emitter array, a light collimating element, a lens array, a light modulating panel, a light relay, a microdisplay, and a projection lens. The illumination subsystem includes a spectral emitter array, a light collimating element, a lens array, and a light modulating panel. The spectral emitter array has a first spectral emitter operable to emit light of a first wavelength, a second spectral emitter operable to emit light of a second wavelength, and a third spectral emitter operable to emit light of a third wavelength. The light collimating element is operable to direct light from the spectral emitter array toward the lens array, and the lens array is operable to direct light toward the light modulating panel. The microdisplay is operable to modulate light and the light relay is operable to direct light from the illumination subsystem toward the microdisplay. The projection lens is operable to direct light toward a viewing screen.

BRIEF DESCRIPTION OF THE DRAWINGS

FIG. 1 is a schematic diagram illustrating an illumination subsystem that provides localized imaging upon a light modulating panel, in accordance with the present disclosure;

FIG. 2 is a schematic diagram illustrating an illumination subsystem that provides colored stripes from spectral emitters upon a light modulating panel, in accordance with the present disclosure;

FIGS. 3a-3c are schematic diagrams illustrating another illumination subsystem 300 that provides time-sequential color using angular modulation of the input illumination, in accordance with the present disclosure;

FIG. 6 is a schematic diagram of an embodiment of an illumination subsystem, which provides a scheme for angular modulation, in accordance with the present disclosure;

FIG. 7 is a schematic diagram illustrating another embodiment of an illumination subsystem 700, which provides a scheme for angular modulation, in accordance with the present disclosure;

FIGS. 8a and 8b are schematic diagrams illustrating two projection system embodiments, in accordance with the present disclosure;

FIG. 9 is a schematic diagram illustrating an exploded view of an illumination system for a direct view display, in accordance with the present disclosure;

FIG. 11 is a schematic diagram illustrating yet another embodiment of a direct-view illumination system.

DETAILED DESCRIPTION

Figure 3B:
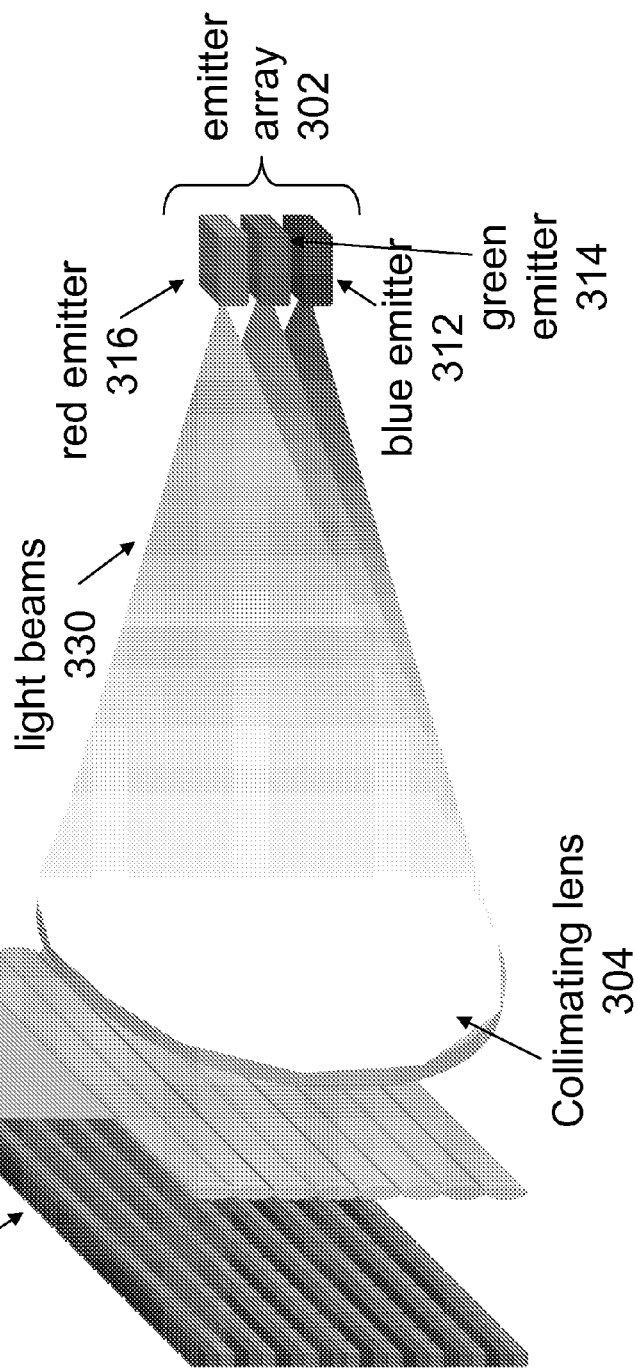

To effectively utilize laser or LED illumination, it is necessary to break away from conventional illumination approaches, especially in direct view systems. Most illumination systems involve homogenizing the light source to avoid non-uniformities and post-polarizing to ensure high contrast. With lasers and LED spectral emitters, it is preferable to maintain initial polarization and accurately direct the beam in order to fill uniformly the panel before focusing locally onto individual modulating pixels. In principle, this results in almost no light loss. This disclosure addresses schemes to achieve this for both direct view and projection systems with a view to time sequential color.

FIG. 1 is a schematic diagram illustrating an illumination subsystem 100 that provides localized imaging upon a light modulating panel. Illumination subsystem 100 includes spectral emitter array 102, light collimating element 104, lens array 106, and light modulating panel 108.

Spectral emitter array 102 includes more than one directional spectral emitter, with each spectral emitter capable of outputting collimated light with at least one predetermined wavelength. Such directional spectral emitters may be lasers or some types of light emitting diodes. In this embodiment, spectral emitter array 102 may include three spectral emitters, e.g., red laser 112, green laser 114, and blue laser 116. Although red, green and blue lasers are described in this example, other lasers or light emitting diodes could be used from other spectral regions, e.g., magenta, cyan, yellow combinations. In another embodiment, spectral emitter array 102 may have six spectral emitters providing first and second red spectral emitters, first and second green spectral emitters, and first and second blue spectral emitters. Such a scheme may be used consistent with the dual-spectral techniques taught in commonly-assigned U.S. Published Application No. 2007/0188711-A1, entitled "Multi-functional active matrix liquid crystal displays," herein incorporated by reference.

In operation, light beams 130 with diffraction-limited collimation properties allow for localized imaging. When a collimated beam from collimating lens 104 is incident on a lens in lens array 106, a diffraction-limited spot is formed at its focal distance at a position determined by the angle of the incident beam. Directing three light beams 130 at different angles at a lens array 106 creates an array having various sets of three primary spots, as shown by spots 122, 124, 126 (enhanced view in FIG. 1a). With suitable imaging geometry, a uniform illumination pattern can be created that enables full color images to be shown from a monochromatic LC panel 108.

In accordance with the present disclosure, there are various efficiencies with using such spectral emitter-based display systems over conventional display technology. For example, the spot array substantially removes the need for an incumbent filter array, as used in conventional direct view LCDs. Refractive lenses also maintain the linear polarization state of a spectral emitter (e.g., laser), thereby avoiding need for a high contrast, low transmission input polarizer in an LC display system. Removing filter arrays and high contrast polarizers can potentially improve optical efficiencies by at least an order of magnitude as well as reducing cost. The extreme collimation properties of laser illumination (and some types of LEDs) can also achieve pixel-sized, spatial color separation in projection systems where micro-displays are used.

By providing high resolution pixel-based spatial color separation, color-sequential displays can be realized. Unlike global time-sequential color illumination systems, lower field rates may be tolerated without noticeable color break-up. This is particularly important for LC systems where material switching periods are a large proportion of the display's flicker-free frame period (e.g., ~17 ms). Using present LC technology, the minimum threshold for color-sequential displays would be to have all three primary colors (RGB) illuminating pixels within the 17 ms period, leaving approximately 5 ms per color. Though LC materials and modes are getting progressively faster, especially with the drive to eliminate motion blurring, switching periods are unlikely to reduce below 1 ms in the foreseeable future. Indeed, pixel-centric illumination may provide low color-sequential field rates. A further aspect of laser sources allows for temporal modulation within a frame effectively hiding the transition between LC states by turning off during this period.

FIG. 2 is a schematic diagram illustrating an illumination subsystem 200 that provides colored stripes from spectral emitters upon a light modulating panel. Illumination subsystem 200 includes spectral emitter array 202, light collimating element 204, cylindrical lens array 206, and light modulating panel 208. Spectral emitter array 202 may include a plurality of spectral emitters, similar to the examples described with reference to FIG. 1.

In operation, light beams 230 from spectral emitters 212, 214, and 216 are collimated by light collimating element 204. The light from the light collimating element 204 is incident upon the cylindrical lens array 206, which directs the light upon light modulating panel 108 to form stripes of red, green, and blue colors in spatial sequence. Although horizontal stripes are shown here, it should be apparent in this example and others in this disclosure that the stripes may be in other orientations, e.g., vertical or diagonal stripes.

Some advantages of one-dimensional structures are in their fabrication and polarization preservation. One-dimensional optical component arrays are more easily fabricated, reducing cost, and in many cases can avoid undetermined birefringence that can act to depolarize light. Aligning the axis of the striped component to the input polarization direction acts in general to preserve polarization of the illuminating light, as this is invariably where the optic axis lies of any stress-induced birefringence.

Figure 3C:
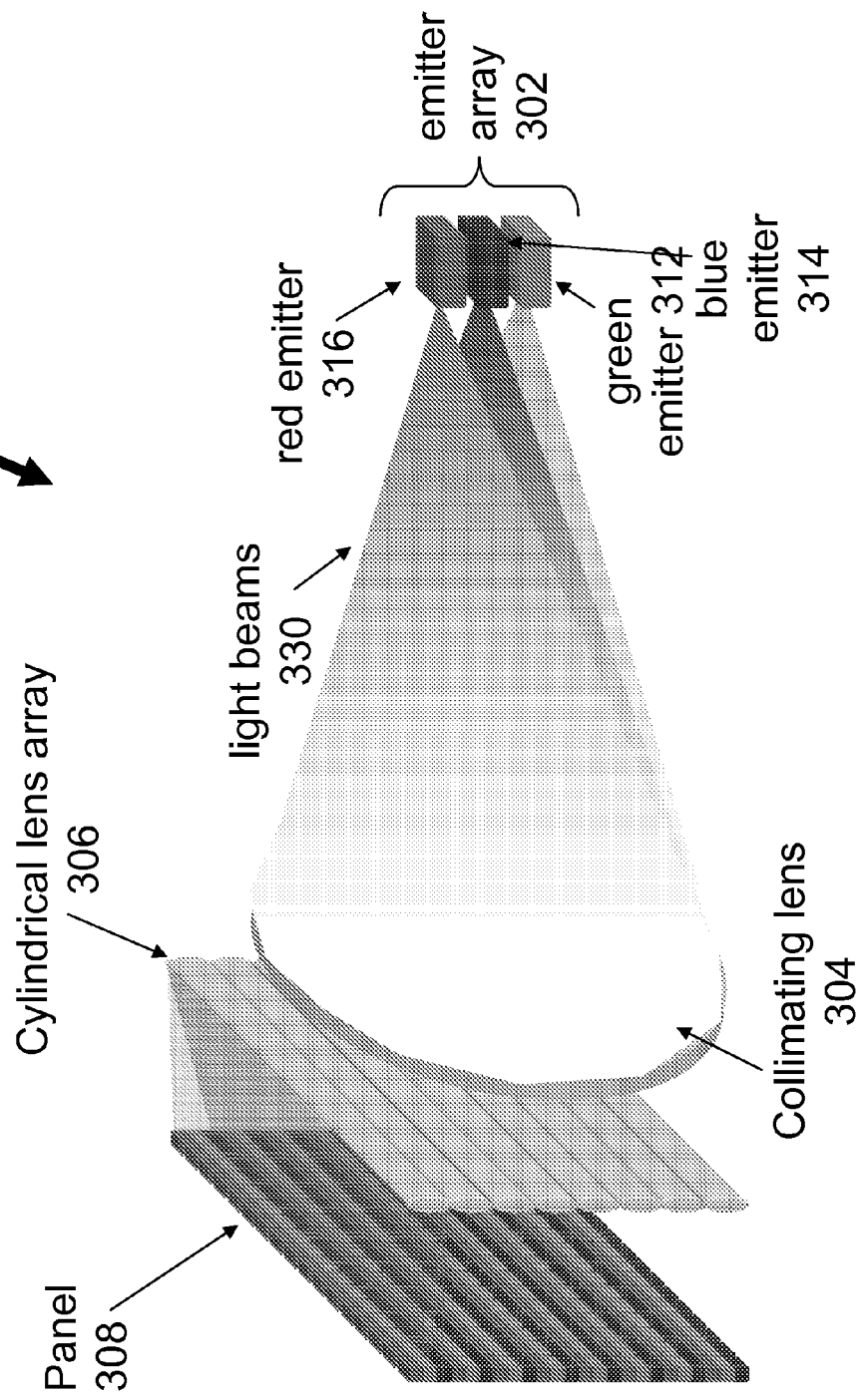

FIGS. 3a-3c are schematic diagrams illustrating another illumination subsystem 300 that provides time-sequential color using angular modulation of the input illumination. Spectral emitters can be modulated to illuminate sequentially with primary red, green and blue (RGB) light. Updating the panel with sequential RGB modulation data in synchronization can yield a full color image. The rate at which the primary fields are illuminated preferably exceed 50 Hz to avoid flicker, and approximately 150 Hz to avoid color break up with full frame illumination where the complete panel is illuminated entirely with a single color at any one time. LC displays have a limit to their switching speed which allows for >50 Hz per color (i.e. >150 Hz panel frame update) but not 150 Hz+ (450 Hz+). Reducing the regions over which any one color illuminates at any given time significantly reduces color break-up (see e.g., U.S. Pat. No. 7,042,527, herein incorporated by reference) and increases optical efficiency with white light illumination (see e.g., U.S. Pat. No. 7,113,231, herein incorporated by reference).

In this example, first, second and third spectral emitter packages 312, 314 and 316 are each capable of emitting at least one of three emission spectra. This may be achieved in various ways known in the art. One technique involves using a plurality of spectral emitters (e.g., laser semiconductor chip) in each spectral emitter package 312, 314 and 316. In this example, red, green and blue laser chips are provided in the spectral emitter package 312, although in other embodiments, a different number of spectral emitters may be provided in each laser package (e.g., six emitters to provide an R1R2G1G2B1B2 output, referencing U.S. Pub. Pat. App. No. 2007/0188711-A1). Other embodiments may have a plurality of spectral emitter packages and different combinations of spectral emitters (other than the three package example here).

In operation, in a first time period, shown by FIG. 3a, first spectral emitter 312 outputs a first spectral output (e.g., red), second spectral emitter 314 outputs a second spectral output (e.g., green), and third spectral emitter 316 outputs a third spectral output (e.g., blue). Thus, similar to the operation described with reference to FIG. 2, first, second and third color strips are incident on the light modulating panel 308, as shown in the figure. In an exemplary embodiment, this time period may be 5 ms, although it should be apparent that it may be different according to panel design and performance parameters.

In reference to FIG. 3b, in a second time period following the first time period, first spectral emitter 312 outputs the third spectral output (e.g., blue), second spectral emitter 314 outputs the first spectral output (e.g., red), and third spectral emitter 316 outputs the first spectral output (e.g., green). Accordingly, first, second and third color strips are incident on the light modulating panel 308, as shown in the figure. Again, in an exemplary embodiment, this time period may be 5 ms.

Referring to FIG. 3c, in a third time period following the second time period, first spectral emitter 312 outputs the second spectral output (e.g., green), second spectral emitter 314 outputs the third spectral output (e.g., blue), and third spectral emitter 316 outputs the first spectral output (e.g., red). Accordingly, first, second and third color strips are incident on the light modulating panel 308, as shown in the figure. Again, in an exemplary embodiment, this time period may be 5 ms.

In sequence, the first, second and third color strips appear to scroll down the light modulating panel 308.

Figure 4:
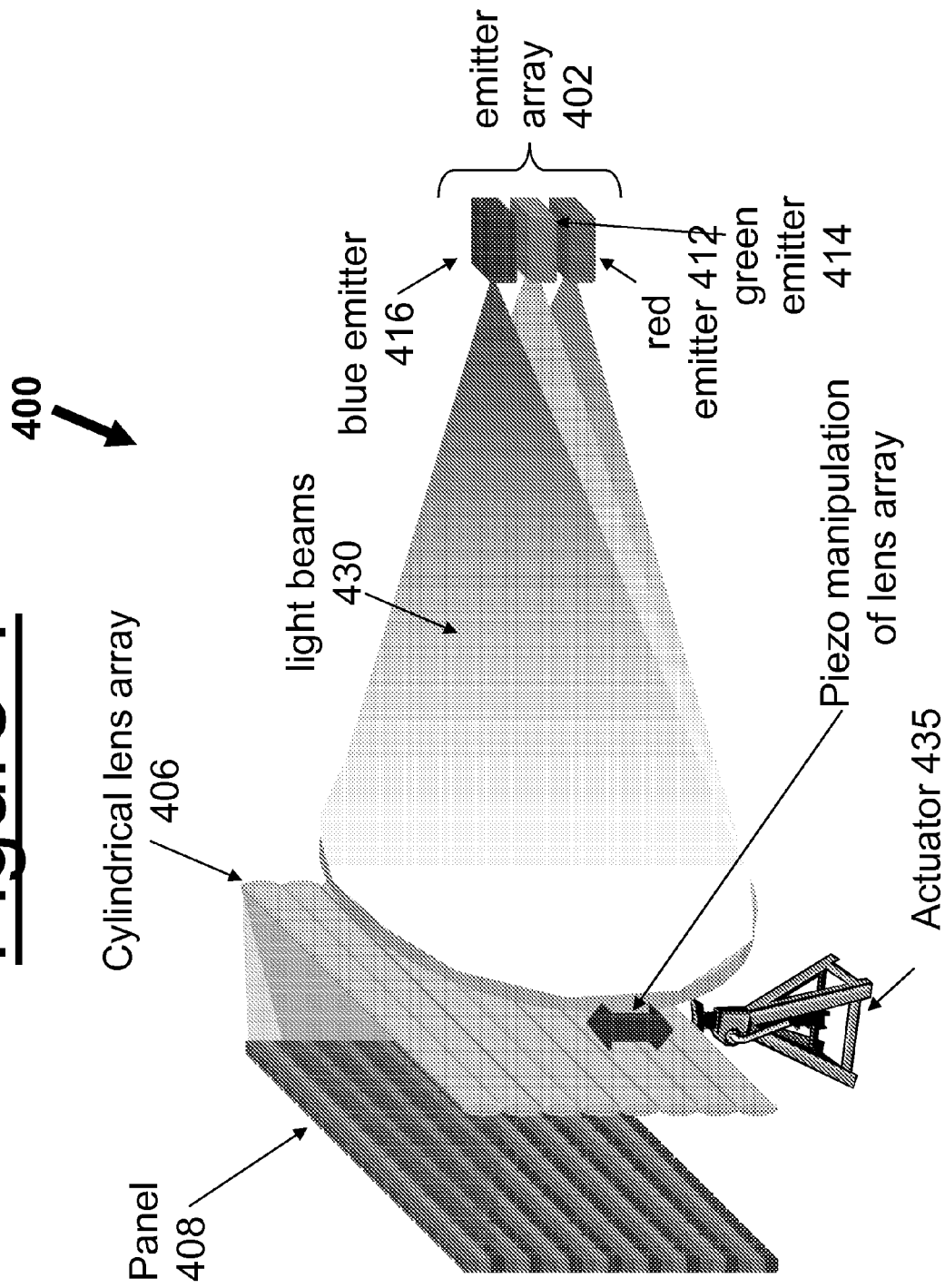
FIG. 4 is a schematic diagram illustrating an embodiment of a spectral emitter-based illumination subsystem in which a cylindrical lens array is mechanically driven, in accordance with the present disclosure.

FIG. 4 is a schematic diagram illustrating an embodiment of another spectral emitter-based illumination subsystem 400 in which a cylindrical lens array 406 is mechanically driven to direct the light beams 430 sequentially between adjacent rows or columns of a panel. This embodiment may be structurally similar to the embodiment shown in FIG. 2, with the addition of actuator 435. For projection micro-display implementations, the mechanical drive may be accomplished using actuator 435. Actuator 435 may be any device capable of mechanically manipulating the position of cylindrical lens array 406, for example, a piezo-manipulator. With movement of the actuator, the first color, second color and third color stripes appear to scroll along the light modulating panel 408.

Figure 5:
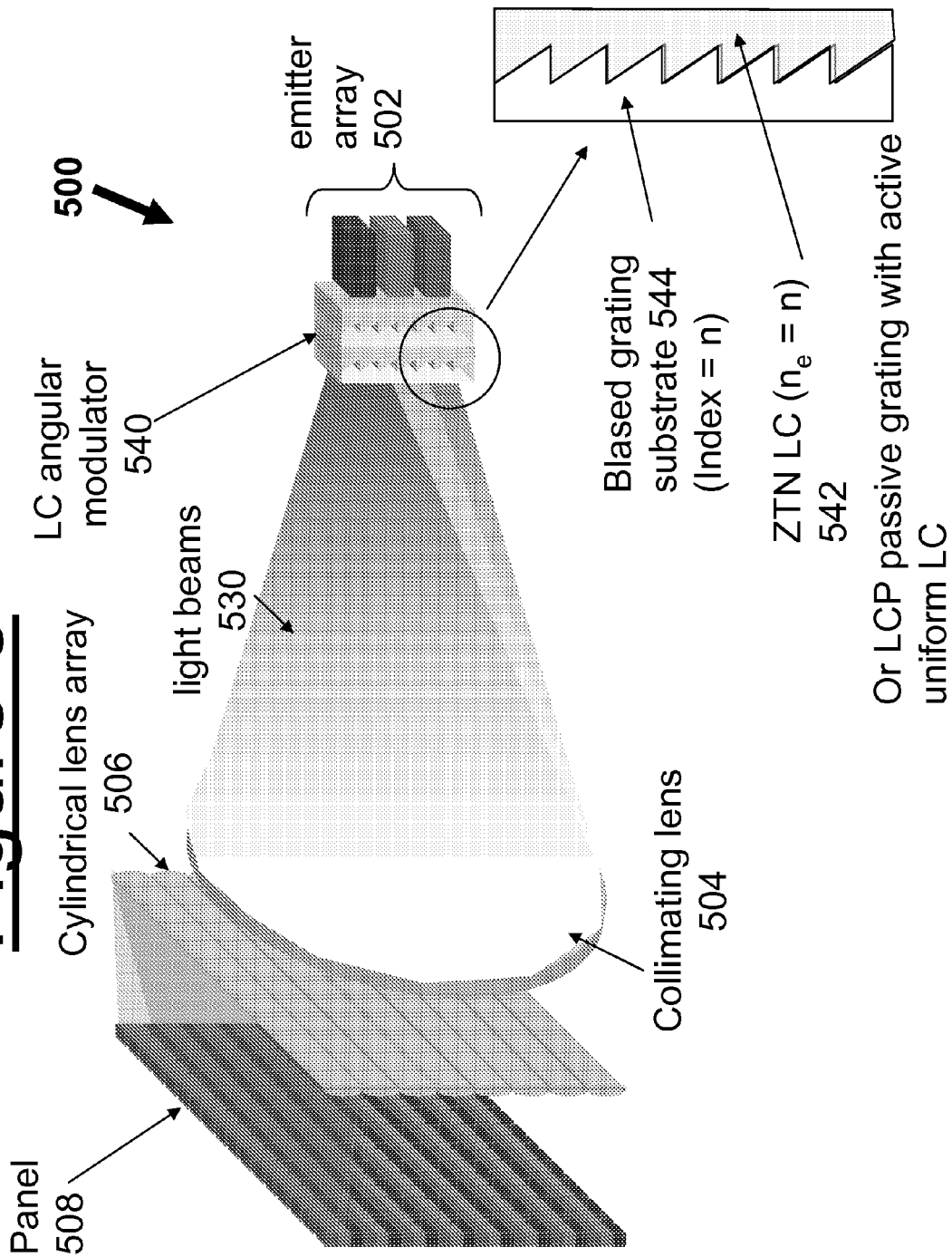
FIG. 5 is a schematic diagram illustrating an embodiment of an illumination subsystem for local pixel color temporal modulation using angular modulating techniques, in accordance with the present disclosure.

FIG. 5 is a schematic diagram illustrating an embodiment of an illumination subsystem 500 for local pixel color temporal modulation using angular modulating techniques.

The display system 500 in this embodiment includes a liquid crystal angular modulator 540 in which the refractive index of the switching material 542 can be made electrically to either to match or not, a serrated substrate 544—effectively switching the direction of light beams 530. This approach is akin to the lens switching technology used by Philips in their autostereo 3D systems. See, e.g., U.S. Pat. No. 6,069,650, entitled "Autostereoscopic display apparatus," to Battersby, herein incorporated by reference. In a similar manner, the active lens switching technology of Ocuity can also be used to realize such liquid crystal beam deflecting components. See, e.g., PCT Pat. No. WO03015424A2, herein incorporated by reference. Angular deflection can also be achieved with more conventional mechanical means such as a mirror in the form of a servo-assisted galvanometer.

FIG. 6 is a schematic diagram of an embodiment of an illumination subsystem 600, which provides a scheme for angular modulation, whereby banks of optical emitters, each bank with similar emissions are positioned such that they couple into a specific input illumination angle.

In an embodiment, a first bank of spectral emitters 612 includes three spectral emitters of substantially the same emission characteristics (e.g., red). Similarly, a second bank of spectral emitters 614 may provide a green emission, and a third bank of spectral emitters 616 may provide a blue emission. The light beams from the respective spectral emitters are combined by light combining elements 620 and directed toward lens 622, which then directs the laser beams on a light path toward collimating lens 604, then cylindrical lens array 606, and light modulating panel 608. Angular modulation may be achieved by temporally modulating these spectral emitters. Though appearing to be wasteful of spectral emitters, this approach is highly compatible with thermally-limited solid state laser or LED emitters, where many sources are often used to achieve sufficient display brightness.

FIG. 7 is a schematic diagram illustrating another embodiment of an illumination subsystem 700, which provides a scheme for angular modulation, whereby banks of optical emitters are positioned such that they couple into a specific input illumination angle. Using a combination of diffractive and refractive optical array elements 704 situated in front of a laser source array 702, angularly distinct or superimposed paths can be defined for different sources allowing angular modulation though temporal switching of the individual sources. As arranged in the figure, laser source array 702 may include a plurality of a first bank of spectral emitters 712 including three spectral emitters of the same emission characteristics (e.g., red). Similarly, a second bank of spectral emitters 714 may provide a green emission, and a third bank of spectral emitters 716 may provide a blue emission.

FIGS. 8a and 8b are schematic diagrams illustrating two projection system embodiments 800 and 850 in which the colored illumination stripes 802 produced by laser illumination subsystem 600 of FIG. 6 are relayed optically by relay lenses 804 and 806 onto a micro-display 808 and then projected via projection lens 810 to screen 812, arranged as shown. Illumination subsystem 600 is shown in this example, however, it may be substituted for another illumination subsystem taught herein or a combination/variation thereof. This approach is a practical solution to the optical diffraction-limited geometry. The exemplary embodiment shown by FIG. 8a also includes a polarization beam splitter 807, enabling the use of a reflective light modulating panel (e.g., LCoS) 808 and a right-angled orientation of the projection lens 810 to the input light path.

For a lens of diameter D, with wavelength $\lambda$ and focal length f, the spot size formed from a highly collimated laser beam is approximately $f\lambda/D$. To illuminate directly a micro-display this spot size would preferably be less than the typical pixel size (~10 μm) as would the pitch and hence the diameter of the lens array elements. For visible light, this implies the focal length of the lenses, and hence its distance to the panel, should be less than 200 μm, making it impractical in most cases. For reflective liquid crystal on silicon micro-displays, good polarization preservation might prevent having the lenses directly on top of the display.

Transmissive systems such as the exemplary shown in FIG. 8b may realize embedded micro-lenses, but presently, cost factors might favor use of an optical relay. De-magnifying the striped illumination when relaying would also allow for a more manufacturable sized lens array element. For instance, the 1080 lines of current high definition (HD) displays could be realized with 5 cm components having a 50 μm pitch.

FIG. 9 is a schematic diagram illustrating an exploded view of an illumination system 900 for a direct view display. In this exemplary embodiment, the concept of spatial color separation with spectral emitter sources can also be used to illuminate direct view LCD panels, as shown by FIG. 9.

Illumination system 900 includes an RGB emitter source array 902 that emits three collimated rectangular beams 906 by passing the spectral emitter light through conventional refractive optical elements 904 existing in a space behind the display. These beams 906 are then directed via collimating element 908 toward total internally reflecting (TIR) prisms 910 into a second layer 912 behind the display between the panel 920 and the collimation element 908. Here they propagate at a slight angle to a reflection grid 914, whose elements deflect light into separate beamlets that propagate near normal to the display plane 920. With reflecting elements 914 having an order of magnitude greater than the wavelength of light (i.e., 10 μm), conventional specular reflection dominates and the beamlets typically maintain coherence as would a beam reflecting from a mirror. This coherence substantially defines its propagation, which is angled to the surface dependent on incident angles. Different colored illumination can therefore be made to have angled incidence onto a lens array 916 placed in front of the panel 920. Again, this angular variation leads to color separation in the focal length of the lens arrays 916 where the liquid crystal of the panel 920 is situated. In this manner, color-separated illumination is achieved in a folded system 900 compatible with direct view LCD displays, avoiding color filters on the panel and a high contrast, low efficiency input polarizer. One-dimensional component arrays again may be desirable for manufacturability and polarization-preservation reasons.

The large pixel size of direct view LCD panels is highly compatible with effective diffraction limited imaging. Typical direct view panels have tri-color pixel groups close to 100 μm buried within approximately 1 mm substrate glass. Having a lens per pixel group makes D=100 μm with f=1 mm, yields a focused spot diameter of around 5 μm for visible light. This is small enough to avoid vignetting at the pixel with significant room to tolerate system imperfectness.

Figure 10:
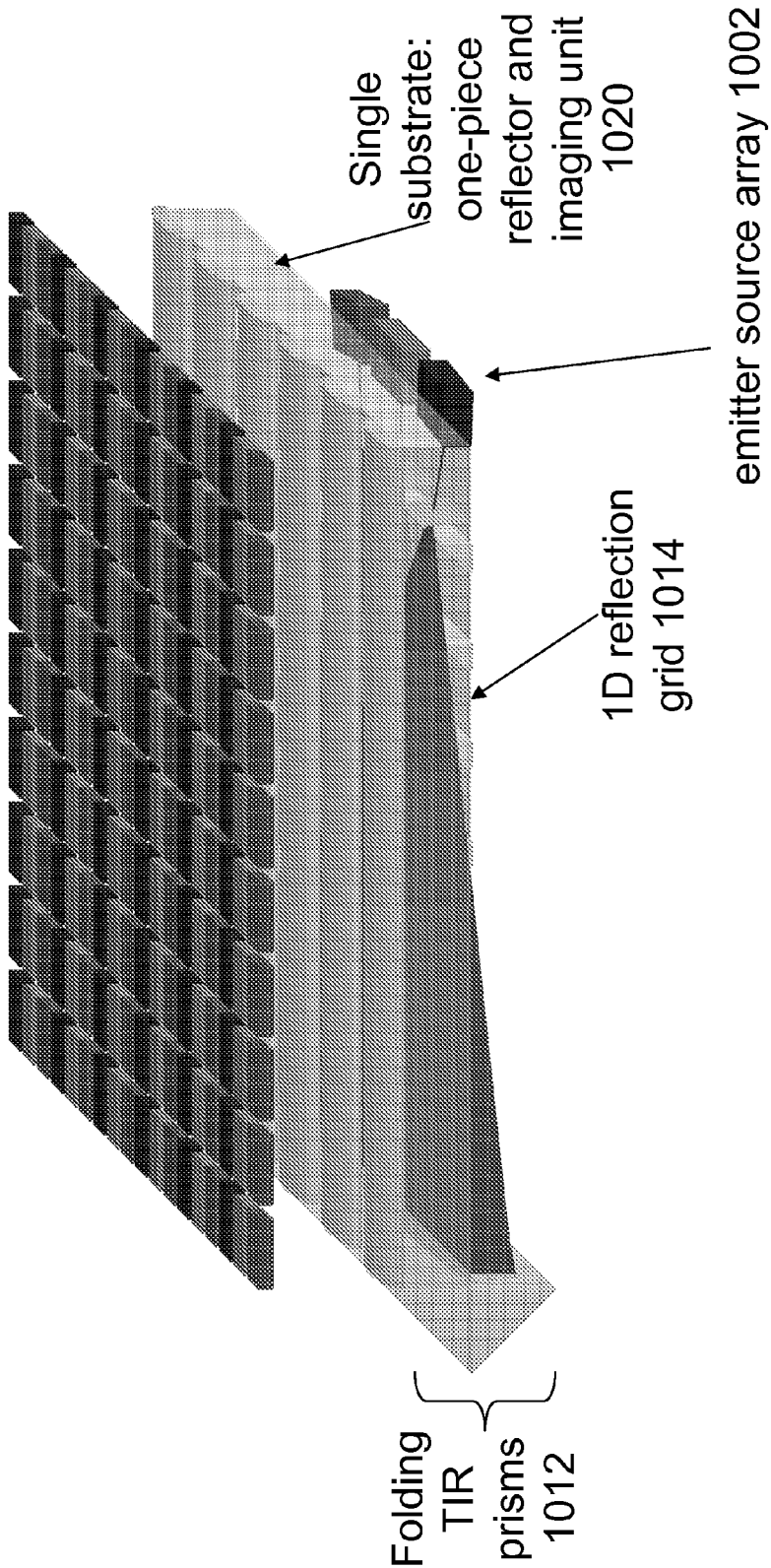
FIG. 10 is a schematic diagram illustrating another direct-view illumination system, in accordance with the present disclosure.

FIG. 10 is a schematic diagram illustrating another direct-view illumination system 1000, where the reflecting grid and the reflecting lens array are formed in a single substrate 1020. Total internal reflection at the air/substrate interface provides good reflectivity at the reflecting grid elements 1014, thereby avoiding expensive optical coating (in some embodiments). This approach can reduce size, weight and cost over the previous embodiment shown in FIG. 9.

FIG. 11 is a schematic diagram illustrating yet another embodiment of a direct-view illumination system 1100 that is similar to the embodiment shown in FIG. 10, except it uses multiple spectral emitters 1102 to perform angular modulation of colored light in a direct view module. The angular modulation results in spatial modulation of color and enables a color-sequential direct view display. Some advantages of a color-sequential system 1100 of this type over the previous static illumination system is in increased resolution, low cost and high efficiency.

It will be appreciated by those of ordinary skill in the art that the teachings herein can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A display system, comprising:
    a spectral emitter array comprising a first spectral emitter operable to emit light of a first wavelength and a second spectral emitter operable to emit light of a second wavelength;
    a light collimating element;
    a lens array; and
    a light modulating panel, comprising first and second pluralities of pixels, the first and second pluralities of pixels comprising at least one spot within respective pixels, wherein each spot comprises a spot-size less than a pixel-size of the respective pixels;
    wherein the light collimating element and the lens array are operable to direct light from the first and second spectral emitters to the at least one spot of the first and second pluralities of pixels of the light modulating panel, respectively;
    wherein the first plurality of pixels and the second plurality of pixels of the light modulating panel are positioned in consecutive first and second rows, respectively, in a pixel array; and
    wherein each pixel is operable to modulate light directed to the light modulating panel.

2. The display system of claim 1, wherein the spectral emitter array further comprises a third spectral emitter operable to emit light of a third wavelength.

3. The display system of claim 2, wherein the spectral emitter array comprises greater than three spectral emitters.

4. The display system of claim 1, wherein the spectral emitter array comprises spectral emitter packages, wherein each spectral emitter package is operable to emit two or more wavelengths of light.

5. The display system of claim 1, wherein the spectral emitters are lasers.

6. The display system of claim 1, wherein the spectral emitters are light emitting diodes.

7. The display system of claim 2, wherein the first wavelength is red, the second wavelength is green, and the third wavelength is blue.

8. The display system of claim 1, wherein the lens array comprises a cylindrical lens array.

9. The display system of claim 8, wherein the cylindrical lens array is operable to image first wavelength light in a first row and second wavelength light in a second row.

10. The display system of claim 8, wherein the cylindrical lens array is operable to image first wavelength light in a first column and second wavelength light in a second column.

11. The display system of claim 1, wherein the lens array is operable to locally image light from the first and second spectral emitters onto predetermined pixels.

12. The display system of claim 11, wherein the predetermined pixels are spatially separated.

13. The display system of claim 8, further comprising a piezo-electric actuator coupled to the lens array.

14. The display system of claim 1, wherein the display system is a direct view system.

15. The display system of claim 1, wherein the display system is a projection system.

16. A direct view display system, comprising:
a spectral emitter array comprising a first spectral emitter operable to emit light of a first wavelength and a second spectral emitter operable to emit light of a second wavelength;
a light collimating element operable to collimate light from the spectral emitter array;
a light directing element;
a reflecting element;
a lens array; and
a light modulating panel, comprising first and second pluralities of pixels, the first and second pluralities of pixels comprising at least one spot within respective pixels, wherein each spot comprises a spot-size less than a pixel-size of the respective pixels;
wherein the first plurality of pixels and the second plurality of pixels of the light modulating panel are positioned in consecutive first and second rows, respectively, in a pixel array;
wherein light directing element receives light from the collimating element in a first direction and transmits the light in substantially the opposite direction in a different but substantially parallel plane to the received light,
wherein the reflecting element is operable to reflect light from the light directing element toward the lens array,
wherein the lens array is operable to direct light toward the light modulating panel, and
wherein light from the first and second spectral emitters is operable to be directed to the at least one spot of the first and second pluralities of pixels of the light modulating panel, respectively, and
wherein each pixel is operable to modulate light directed to the light modulating panel.

17. The direct view display system of claim 16, wherein the spectral emitter array further comprises a third spectral emitter operable to emit light of a third wavelength.

18. The direct view display system of claim 16, wherein the spectral emitter array comprises greater than three spectral emitters.

19. The direct view display system of claim 16, wherein the spectral emitter array comprises spectral emitter packages, wherein each spectral emitter package is operable to emit two or more wavelengths of light.

20. The direct view display system of claim 16, wherein the spectral emitters are lasers.

21. The direct view display system of claim 16, wherein the spectral emitters are light emitting diodes.

22. The direct view display system of claim 16, further comprising beam expanding optical elements located in a light path between the spectral emitter array and the collimating element.

23. The direct view display system of claim 16, wherein the light directing element comprises a total internal reflecting prism.

24. The direct view display system of claim 16, wherein the light directing element comprises a set of mirrors.

25. A projection display system, comprising:
an illumination subsystem comprising:
a spectral emitter array comprising a first spectral emitter operable to emit light of a first wavelength, a second spectral emitter operable to emit light of a second wavelength, and a third spectral emitter operable to emit light of a third wavelength;
a light collimating element,
a lens array, and
a light modulating panel, comprising first and second pluralities of pixels, the first and second pluralities of pixels comprising at least one spot within respective pixels, wherein each spot comprises a spot-size less than a pixel-size of the respective pixels;
wherein the first plurality of pixels and the second plurality of pixels of the light modulating panel are positioned in consecutive first and second rows, respectively, in a pixel array;
wherein the light collimating element is operable to direct light from the spectral emitter array toward the lens array,
wherein the lens array is operable to direct light toward the light modulating panel, and
wherein light from the first and second spectral emitters is operable to be directed to the at least one spot of the first and second pluralities of pixels of the light modulating panel, respectively, each pixel operable to modulate light directed to the light modulating panel;
a light relay;
a microdisplay operable to modulate light, wherein the light relay is operable to direct light from the illumination subsystem toward the microdisplay; and
a projection lens operable to direct light toward a viewing screen.

26. The display system of claim 1, wherein, in a first time period, the first and second spectral emitters are operable to emit light of the first and second wavelengths, respectively, and further wherein, in a second time period, the first spectral emitter is operable to emit light of the second wavelength and the second spectral emitter is operable to emit light of a third wavelength.

27. The display system of claim 16, wherein, in a first time period, the first and the second spectral emitters are operable to emit light of the first and second wavelengths, respectively, and further wherein, in a second time period, the first spectral emitter is operable to emit light of the second wavelength and the second spectral emitter is operable to emit light of a third wavelength.

28. The projection display system of claim 25, wherein, in a first time period, the first and second spectral emitters are operable to emit light of the first and second wavelengths, respectively, and further wherein, in a second time period, the first spectral emitter is operable to emit light of the second wavelength and the second spectral emitter is operable to emit light of a third wavelength.

29. A display system, comprising:
- a spectral emitter array comprising a first spectral emitter operable to emit light of a first wavelength and a second spectral emitter operable to emit light of a second wavelength;
- a light collimating element;
- a lens array; and
- a light modulating panel, comprising first and second pluralities of pixels, the first and second pluralities of pixels comprising at least one spot within respective pixels, wherein each spot comprises a spot size less than a pixel size of the respective pixels;
- wherein the light collimating element and the lens array are operable to direct light from the first and second spectral emitters to the at least one spot of the first and second pluralities of pixels of the light modulating panel, respectively; and
- wherein each pixel is operable to modulate light directed to the light modulating panel.

* * * * *